United States Patent [19]
Lee et al.

[11] Patent Number: 5,293,759
[45] Date of Patent: Mar. 15, 1994

[54] DIRECT HEAT RECOVERY ABSORPTION REFRIGERATION SYSTEM

[75] Inventors: Chung-Chiang Lee; Hung-Yao Chao; Peggy Lin; Chi-Chen Chung; Yuh-Yuan Yo, all of Hsinchu, Taiwan

[73] Assignee: Industrial Technology research Institute, Hsinchu, Taiwan

[21] Appl. No.: 914,478

[22] Filed: Jul. 15, 1992

[51] Int. Cl.$^5$ .............................. F25B 27/00
[52] U.S. Cl. ........................ 62/476; 62/101
[58] Field of Search .................. 62/476, 101, 489

[56] References Cited

U.S. PATENT DOCUMENTS

| | | | |
|---|---|---|---|
| 1,870,265 | 8/1932 | Seligmann | 62/112 |
| 3,014,349 | 12/1961 | Leonard | 62/476 |
| 3,131,552 | 5/1964 | McNeely | 62/476 |
| 3,154,930 | 11/1964 | Aronson | 62/489 |
| 3,167,929 | 2/1965 | Rorschach | 62/101 |
| 4,178,989 | 12/1979 | Takeshita | 165/62 |

*Primary Examiner*—John M. Sollecito
*Assistant Examiner*—William C. Doerrler
*Attorney, Agent, or Firm*—Ladas & Parry

[57] ABSTRACT

An absorption refrigeration system uses a solution and a refrigerant contained in the solution as working mediums. The system includes (a) a generator for heating the solution to change a portion of the refrigerant into vapor; (b) a condenser communicated with the generator, for condensing refrigerant vapor coming from the generator; (c) a throttling device communicated with the condenser, for throttling condensed refrigerant coming from the condenser; (d) an evaporator communicated with said throttling device, having water circulating therewithin, capable of effecting heat transfer between the refrigerant coming from the throttling device and the circulating water; (e) an absorber communicated with the evaporator, having solution reservoired therewithin, for absorbing refrigerant coming from the evaporator by means of the reservoired solution; and (f) a heat exchanger communicated with the absorber and the generator, for performing indirect heat exchange between solution coming from the generator and solution coming from the absorber, characterized in that a solution mixing device, disposed between the heat exchanger and the generator, is provided for mixing solution leaving the generator and solution going to enter the generator. The system disclosed is capable of increasing the performance of heat transfer in the generator and reducing the cost of the generator, and thermal stress will also be reduced.

6 Claims, 6 Drawing Sheets

DIRECT HEAT RECOVERY ABSORPTION REFRIGERATION SYSTEM

FIELD OF THE INVENTION

The present invention relates to an absorption refrigeration system, especially to a direct heat recovery absorption refrigeration system.

BACKGROUND OF THE INVENTION

With reference to FIG. 1 and FIG. 2, the thermodynamic cycle and the schematic diagram of a conventional absorption refrigeration system are respectively shown therein. As shown in FIG. 2, the conventional absorption refrigeration system consists of a generator 31, an absorber 32, a condenser 33, an evaporator 34 and a heat exchanger 41. In such a conventional absorption refrigeration system, an aqueous solution, such as aqueous lithium bromide solution or aqueous ammonia solution, is circulating between the generator 31 and the absorber 32. During operation, cold solution flowing in pipe 1 is pumped toward the generator 31 by a pump 35 through the heat exchanger 41 in which cold solution is heated by hot solution flowing in pipe 3 and then enters the generator 31. In the generator 31, solution coming from the pipe 2 is heated again to release refrigerant vapor, and the refrigerant vapor subsequently enters the condenser 33 by way of a pipe 5. In the condenser 33, high temperature and high pressure refrigerant vapor is condensed to release heat Qc, then the condensed refrigerant flows into the evaporator 34 through a throttling device 21 which reduces the pressure of the condensed refrigerant. In the evaporator 34, refrigerant absorbs heat Qe and changes into low temperature and low pressure vapor which subsequently enters the absorber 32. In the absorber 32, low temperature and low pressure refrigerant is absorbed by solution reservoired therein and released heat Qa. Then, the above processes are repeated.

In the conventional absorption refrigeration system, the heat exchanger 41 is used for recovering part of the heat contained in the solution leaving the generator 31, so as to raise the temperature of the solution entering the generator 31. However, the specific heat and the mass flow rate of the solution flowing in the pipe 3 are less than those of the solution flowing in the pipe 1. Therefore, the temperature rise of the solution which has just absorbed heat in the heat exchanger 41 is less than the temperature drop of the solution which has just released heat in the heat exchanger 41. Furthermore, the temperature of the solution entering the generator 31 is lower than the equilibrium temperature in the generator 31. In other words, as shown in FIG. 1, solution entering the generator 31 is at state 2", however the solution reservoired in generator 31 is at state 2'. Since the pressure of the solution in the pipe 2 (at state 2a) is lower than that in the generator 31, the solution entering the generator 31 is heated first to a state whose thermodynamic pressure is equal to that in the generator 31. In the meantime, a portion of the refrigerant vapor in the generator 31 is absorbed by the solution entering thereinto. The absorbed refrigerant vapor can be used to generate a refrigeration effect if it is not absorbed by the solution entering the generator 31. Therefore, if the temperature of the solution entering the generator 31 is lower than the equilibrium temperature in the generator 31, there are three disadvantages:

1. Heat transfer occurred in the heat exchanger 41 is mainly facilitated by convection whose coefficient of heat transfer is smaller than that of the phase separation boiling heat transfer which produces vapor. Therefore, much more areas and much more tubes for heat transfer are needed, if heat transfer is facilitated by convection only.

2. Since the pressure of the solution entering the generator 31 is lower than that in the generator 31, the solution entering the generator 31 absorbs a portion of the refrigerant vapor in the generator 31 to reach the equilibrium state in the generator 31. Thus, additional heat is required to evaporate the refrigerant vapor absorbed by the incoming solution, and this additional heat occupies a very great percentage of heat Qg.

3. The pressure in the generator 31 must be raised to the design pressure to obtain a steady-state operation, thus the warm-up time is usually longer than that of a conventional vapor compression type refrigeration system. The long warm-up time is a common drawback of absorption refrigeration systems.

SUMMARY OF THE INVENTION

The present invention provides an improved absorption refrigeration system capable of overcoming the above mentioned disadvantages. The primary object of the present invention is to provide a solution mixing device disposed between the generator and the heat exchanger to perform a direct heat exchange between cold solution and hot solution so as to enhance the efficiency of the generator and reduce the operation cost of absorption refrigeration systems.

An absorption refrigeration system according to this invention uses a solution and a refrigerant contained in the solution as working mediums. The system comprises (a) a generator for heating the solution to change a portion of the refrigerant into vapor; (b) a condenser communicated with the generator, for condensing refrigerant vapor coming from the generator; (c) a throttling device communicated with the condenser, for throttling condensed refrigerant coming from the condenser; (d) an evaporator communicated with said throttling device, having water circulating therewithin, capable of effecting heat transfer between the refrigerant coming from the throttling device and (e) an absorber communicated with the evaporator, having solution reservoired therewithin, for absorbing refrigerant coming from the evaporator by means of the reservoired solution; and (f) a heat exchanger communicated with the absorber and the generator, for performing indirect heat exchange between solution coming from the generator and solution coming from the absorber, characterized in that a solution mixing device, disposed between the heat exchanger and the generator, is provided for mixing solution leaving the generator and solution going to enter the generator.

This and other objects, advantages and features of the present invention will become more apparent from the following description and drawings in which:

DETAILED DESCRIPTION OF THE PREFERRED EMBODIMENTS

Figure 1:
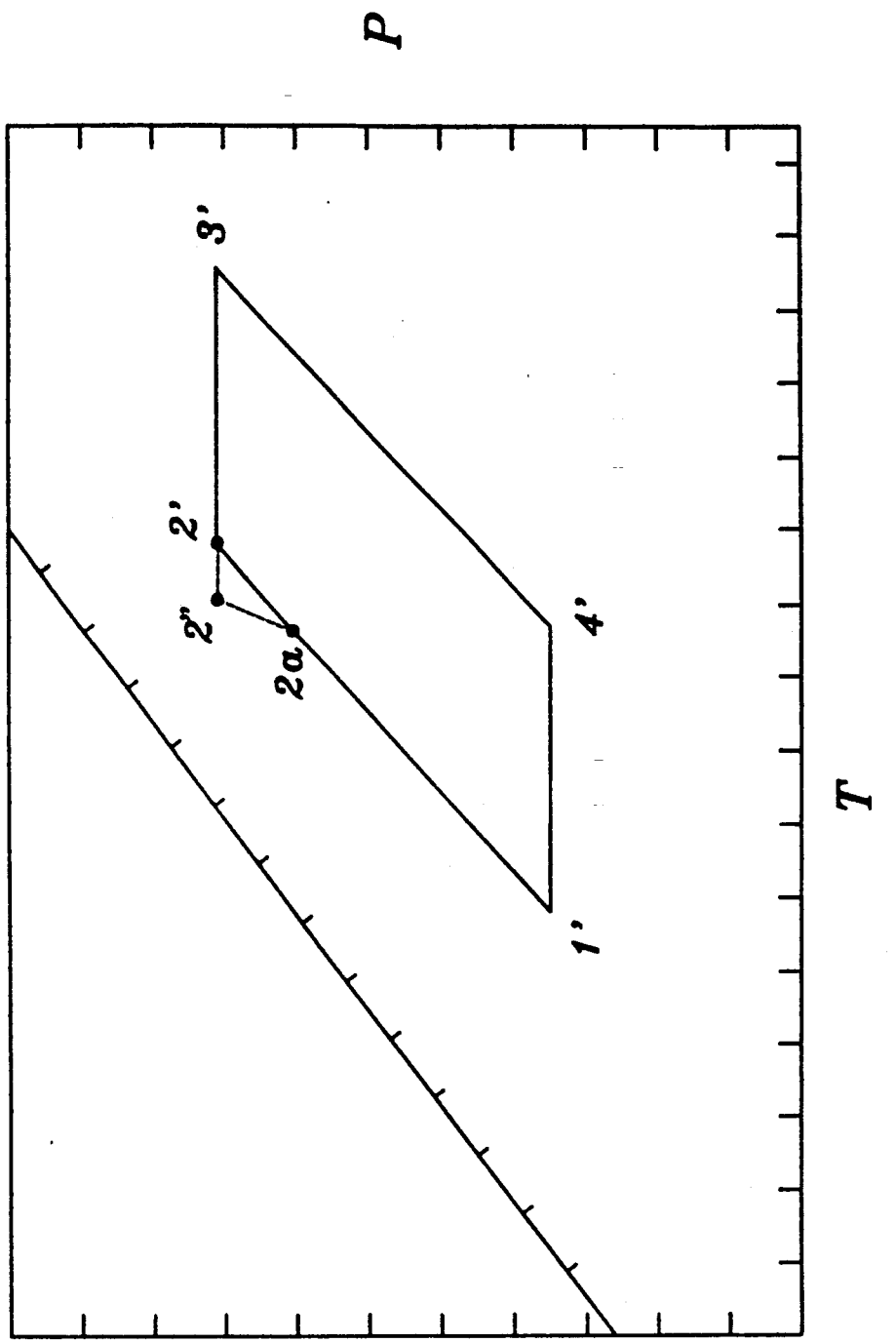
FIG. 1 is a diagram showing a thermodynamic cycle of a conventional single-effect absorption refrigeration system.
Figure 2:
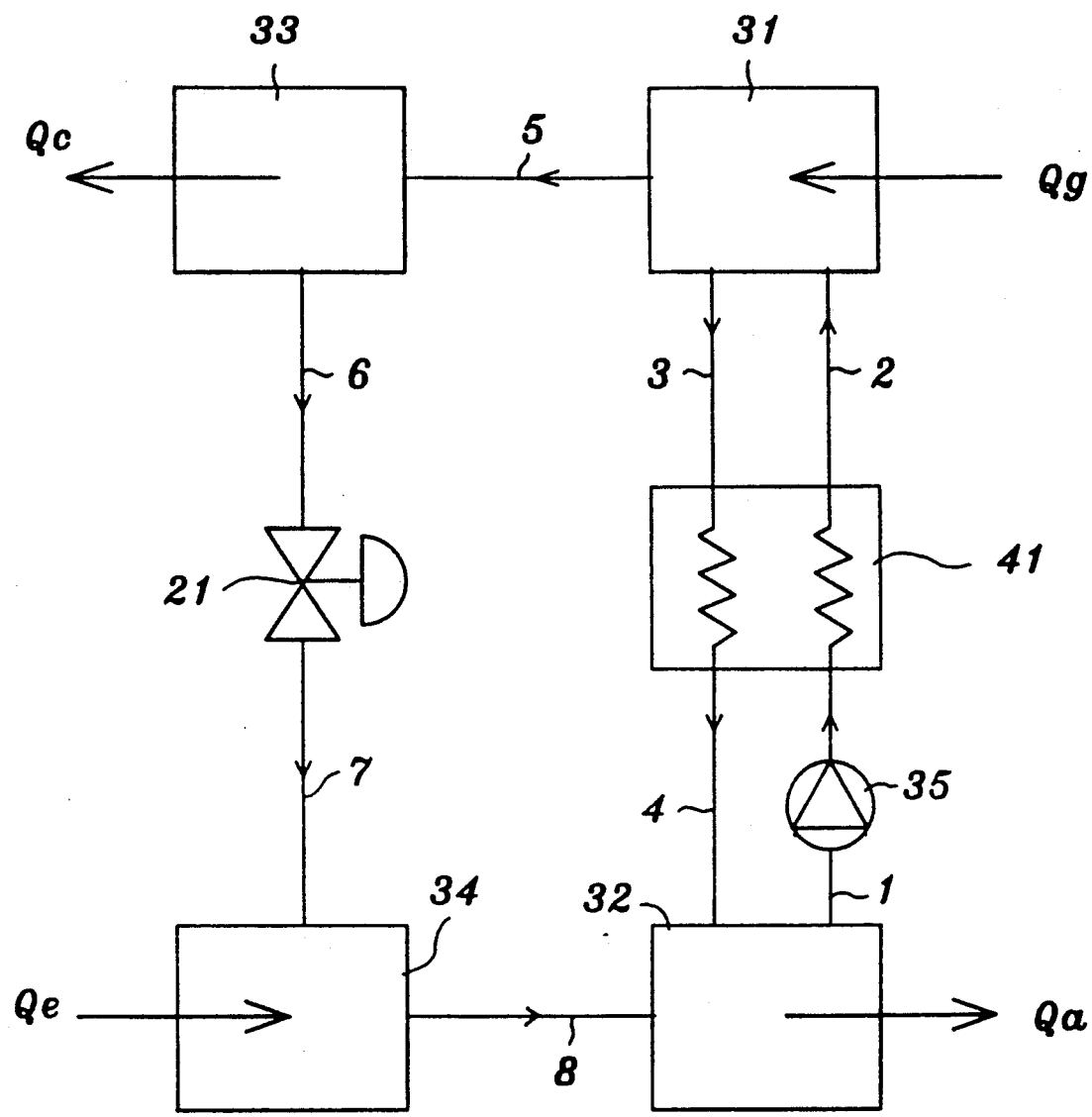
FIG. 2 is a schematic diagram of the conventional single-effect absorption refrigeration system related with FIG. 1.
Figure 3:
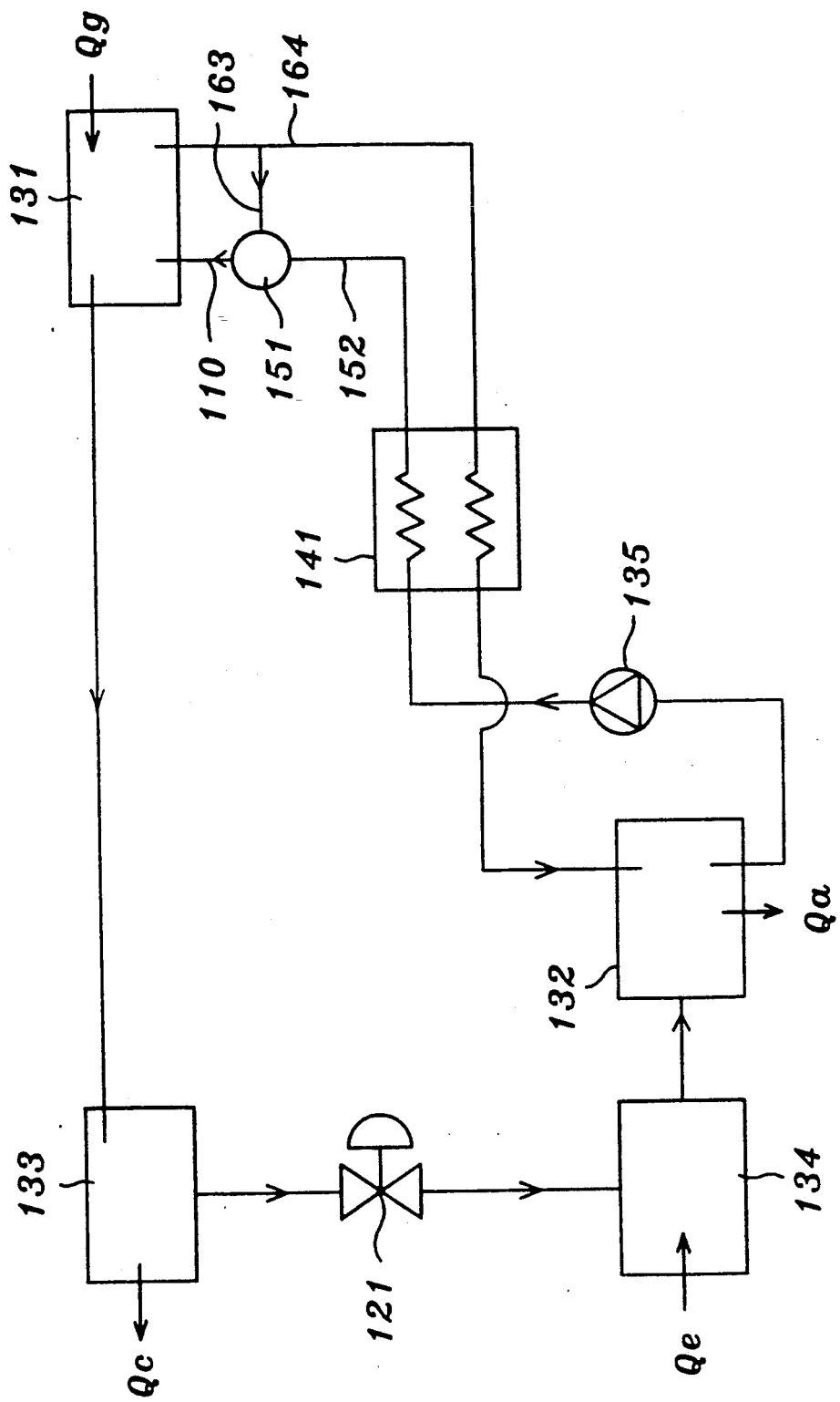
FIG. 3 is a schematic diagram of an absorption refrigeration system according to the present invention.
Figure 5:
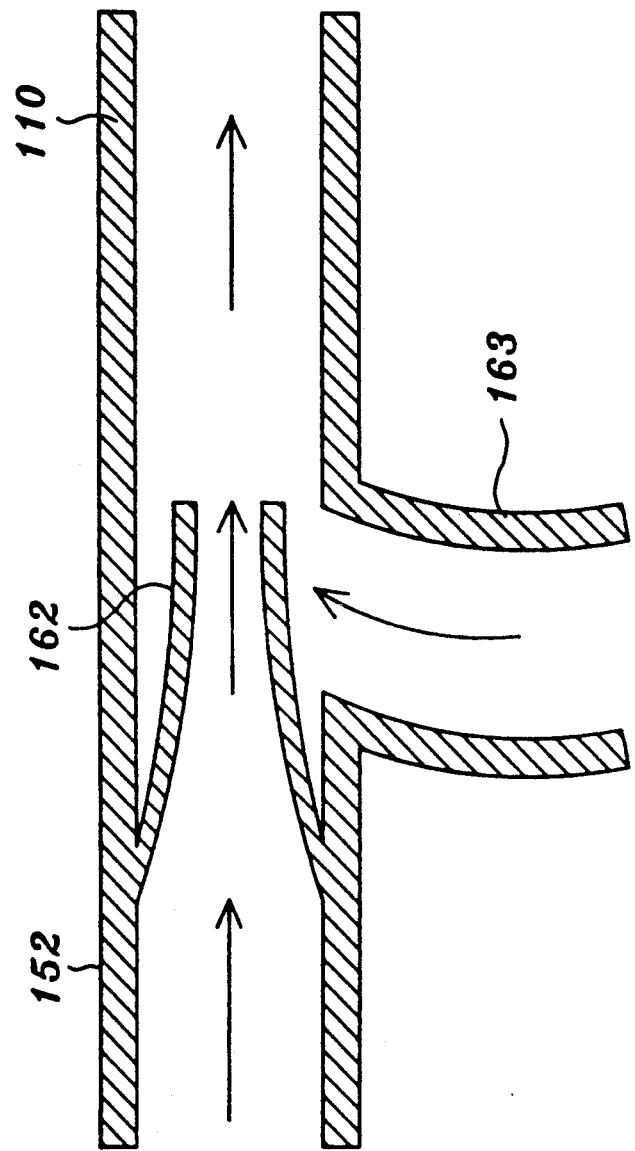
FIG. 5 is a longitudinal cross-sectional view showing the structure of the absorbent mixing device according to the present invention.

As shown in FIG. 3, an absorption refrigeration system according to this invention includes a generator 131 for producing high temperature and high pressure refrigerant vapor; a condenser 133 disposed between the generator 131 and a throttling device 121, for condensing refrigerant vapor; an evaporator 134 disposed between the throttling device 121 and an absorber 132. Liquid refrigerant entering the evaporator 134 absorbs heat from cooling water circulating thereinside. The absorber 132 is connected to the evaporator 134, for absorbing the refrigerant vapor coming from the evaporator 134. A heat exchanger 141 is disposed between the absorber 132 and the generator 131 to perform indirect heat exchange between hot solution coming from the generator 131 and cold solution coming from the absorber 132. Furthermore, a solution mixing device 151 is disposed between the generator 131 and the heat exchanger 41, and a by-pass pipe 163 is provided for communicating a pipe 164 and the solution mixing device 151. The pipe 164 communicates the absorber 132 and the generator 131. By this arrangement, hot solution coming from the generator 131 will be introduced to the solution mixing device 151 before entering the heat exchanger 141. The structure of the solution mixing device 151 is shown in FIG. 5. As shown in FIG. 5, the structure of the solution mixing device 151 is like that of an inducer. According to Bernoulli's theory, solution coming from the pump 135 which pumps solution toward the generator 131 will be accelerated by a nozzle 162 disposed within the solution mixing device 151, and pressure at the exit of the nozzle 162 will decrease. Due to the low pressure at the exit of the nozzle 162, hot solution coming from the generator 131 will be drawn into the solution mixing device 151. After being mixed, mixed solution enters the generator 131 by way of pipe 110. The temperature of the solution in pipe 110 approaches equilibrium temperature in the generator 131. Optimum flow ratio of hot solution to cold solution is selected in such a way that the temperature of solution in pipe 11 is close to the equilibrium temperature under the pressure in the generator 131.

Figure 4:
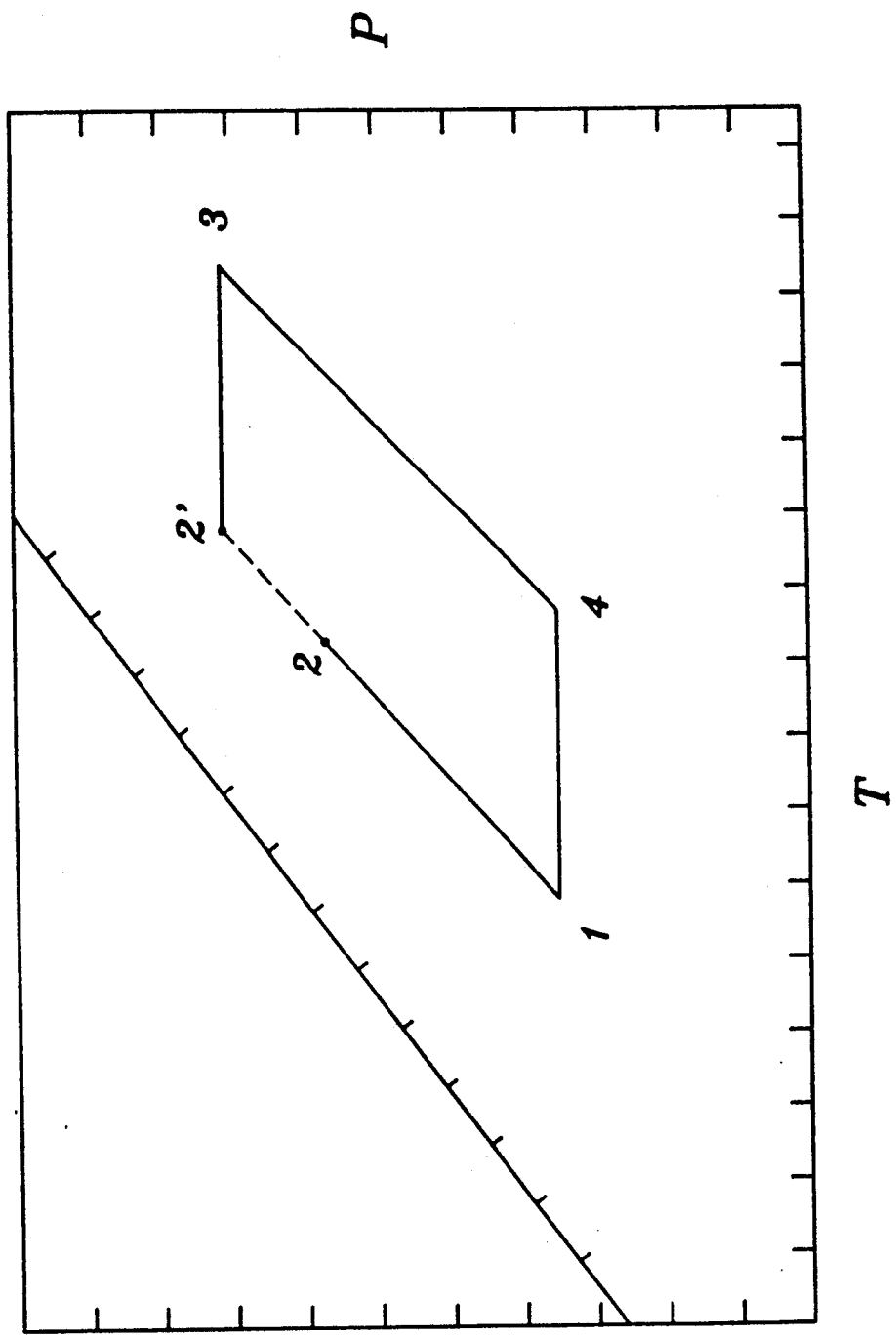
FIG. 4 is an ideal diagram showing the thermodynamic cycle of the system shown in FIG. 3.

In addition, since the pressure of mixed solution in pipe 110 is made equal to that in the generator 131, the mixed solution entering the generator 131 will not absorb the refrigerant vapor. Thus, heat transfer occurred in generator 131 is boiling heat transfer only, and heat Qg input into the generator 131 will not be used ineffectively to balance the nonequilibrium between entering solution and the solution reservoired in the generator 31. The boiling heat transfer has high heat transfer coefficient. Besides, due to the mixing of hot solution and cold solution, mass flow rate of solution entering the generator 131 is highly increased. The performance of heat transfer is thus enhanced and the thermodynamic cycle is close to an ideal one shown in FIG. 4.

Figure 6:
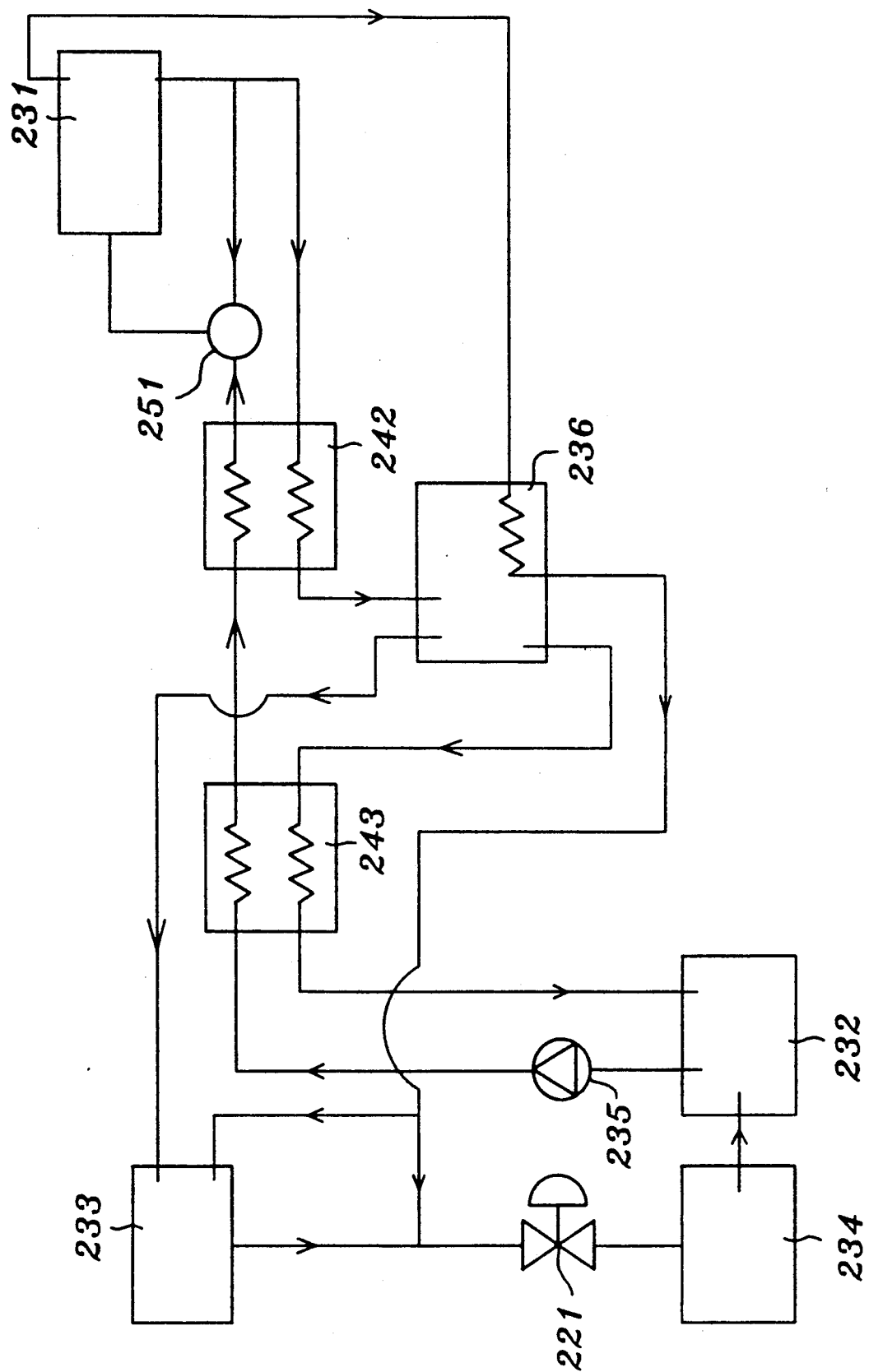
FIG. 6 is the diagram showing an improved double-effect absorption refrigeration system according to the present invention.

It should be noted that direct heat recovery device, i.e., solution mixing device according to the present invention, may also be applied to a double-effect absorption refrigeration system shown in FIG. 6. The double-effect absorption refrigeration system is provided with two heat exchangers 242 and 243, a low-pressure generator 236 and a high-pressure generator 231. The basic principle and operations of the double-effect absorption refrigeration system are the same as those of the absorption refrigeration system shown in FIG. 3. In the same manner, solution mixing apparatuses is capable of being applied to a triple-effect absorption refrigeration system.

Since the temperature of the solution entering the generator is increased due to the addition of the solution mixing device and the ineffective heat transfer in the generator is reduced, the temperature rise of the solution in the generator is faster than that of the conventional design; therefore, the warm-up time of the direct heat recovery absorption refrigeration system is also reduced.

Summing up, solution mixing device according to the present invention is capable of increasing the performance of heat transfer in a generator. Furthermore, due to high performance of heat transfer, number of heat transfer tubes required in a generator is thus reduced, and manufacturing cost of generators is capable of being lessened. Also, temperature difference between heat transfer pipes is decreased, and thermal stress induced by temperature difference will also be reduced, and the generator will have a much longer life-time. Moreover, the warm-up time of direct heat recovery absorption refrigeration system will also be shortened.

While the invention has been described by way of examples and in terms of several preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A direct heat recovery absorption refrigeration system using a solution and refrigerant contained in the solution as working mediums, comprising:
   (a) a generator for heating solution introduced thereto to produce high temperature and high-concentrated solution, and to evaporate refrigerant into vapor;
   (b) a condenser in communication with said generator, for condensing refrigerant vapor coming from said generator;
   (c) a throttling device in communication with said condenser, for throttling condensed refrigerant coming from said condenser;
   (d) an evaporator in communication with said throttling device, having water circulating therewithin, capable of effecting heat transfer between the refrigerant coming from said throttling device and the circulating water;
   (e) an absorber in communication with said evaporator, having solution reservoired therewithin, for absorbing refrigerant coming from said evaporator by means of the reservoired solution;
   (f) and heat exchanger in communication with said absorber and said generator, for performing indirect heat exchange between part of the high temperature and high-concentrated solution coming from said generator and cold solution coming from said absorber to produce moderate temperature and low-concentrated solution; and (g) a high concentrated and low concentrated solution mixing device, disposed between said heat exchanger and said generator, for mixing another part of the high temperature and high-concentrated solution leaving said generator and the moderate temperature and low-concentrated solution entering said generator from said heat exchanger, whereby the temperature of the low-concentrated solution introduced into said generator reaches equilibrium temperature under the pressure in said generator.

2. A direct heat recovery absorption refrigeration system as claimed in claim 1, wherein the solution is aqueous lithium-bromide solution.

3. A direct heat recovery absorption refrigeration system as claimed in claim 1, wherein the solution is aqueous ammonia solution.

4. A direct heat recovery absorption refrigeration system as claimed in claim 1, wherein solution from said generator is introduced from inside of said generator.

5. A direct heat recovery absorption refrigeration system as claimed in claim 1, wherein solution from said generator is introduced from a pipe communicated with said generator.

6. A direct absorption refrigeration system as claimed in claim 1, wherein said mixing device is an inducer.

* * * * *